(12) United States Patent
Wu et al.

(10) Patent No.: US 10,683,380 B2
(45) Date of Patent: Jun. 16, 2020

(54) COPOLYMER OF ETHYLENE AND A CONJUGATED DIENE, AND PROCESS FOR ITS PRODUCTION

(71) Applicant: Changchun Institute of Applied Chemistry Chinese Academy of Sciences, Changchun (CN)

(72) Inventors: Chunji Wu, Changchun (CN); Bo Liu, Changchun (CN); Dongmei Cui, Changchun (CN)

(73) Assignee: Changchun Institute of Applied Chemistry Chinese Academy of Sciences, Changchun (CN)

( * ) Notice: Subject to any disclaimer, the term of this patent is extended or adjusted under 35 U.S.C. 154(b) by 0 days.

(21) Appl. No.: 16/362,992

(22) Filed: Mar. 25, 2019

(65) Prior Publication Data

US 2019/0218328 A1     Jul. 18, 2019

Related U.S. Application Data

(62) Division of application No. 15/721,902, filed on Sep. 30, 2017, now Pat. No. 10,280,243.

(30) Foreign Application Priority Data

Apr. 11, 2017    (CN) .......................... 2017 1 0234365

(51) Int. Cl.
    *C08F 236/06*      (2006.01)
    *B60C 1/00*        (2006.01)
    *C08F 4/54*        (2006.01)

(52) U.S. Cl.
    CPC .............. *C08F 236/06* (2013.01); *B60C 1/00* (2013.01); *B60C 1/0016* (2013.01);
(Continued)

(58) Field of Classification Search
    CPC .... C08F 236/06; C08F 4/545; C08F 2800/10; C08F 2800/20; B60C 1/00; B60C 1/0016; B60C 1/0025
(Continued)

(56) References Cited

U.S. PATENT DOCUMENTS 4,108,921 A * 8/1978 Langer, Jr. ............ C08F 291/00
                                                  525/250
8,623,976 B2   1/2014   Hou et al.
(Continued)

OTHER PUBLICATIONS

Zhang et al., Quantitative Determination of Short-Chain Branching Content and Distribution in Commercial Polyethylenes by Thermally Fractionated Differential Scanning Calorimetry, Polymer Engineering and Science, Dec. 2003, vol. 43(12), pp. 1878-1888.
(Continued)

*Primary Examiner* — William K Cheung (57) ABSTRACT

A copolymer of ethylene and a conjugated diene is provided, in which ethylene content in the copolymer is greater than 20 mol %, the copolymer has a glass transition temperature between −110° C. and −90° C., and continuous methylene sequence lengths (MSL) in the copolymer are in a range of 12-162 methylene units. A method for producing the copolymer, comprising copolymerizing ethylene and a conjugated diene in the presence of a catalyst system to obtain the copolymer is also provided, in which the catalyst system comprises a heterocyclic-fused cyclopentadienyl rare-earth metal complex, an organoboron salt compound and an organoaluminum compound, wherein the heterocyclic-fused cyclopentadienyl rare-earth metal complex is represented by the structural formula:

(Continued)

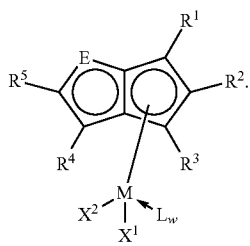

10 Claims, 4 Drawing Sheets

(52) U.S. Cl.
CPC ............ *B60C 1/0025* (2013.01); *C08F 4/545* (2013.01); *C08F 2800/10* (2013.01); *C08F 2800/20* (2013.01)

(58) Field of Classification Search
USPC .......................................................... 526/133
See application file for complete search history.

(56) References Cited

U.S. PATENT DOCUMENTS

| | | |
|---|---|---|
| 8,653,290 B2 | 2/2014 | Kaita et al. |
| 8,962,743 B2 | 2/2015 | Kaita et al. |
| 8,962,744 B2 | 2/2015 | Horikawa et al. |
| 9,056,936 B2 | 6/2015 | Horikawa et al. |
| 9,139,680 B2 | 9/2015 | Horikawa et al. |
| 2016/0229928 A1 | 8/2016 | Cui et al. |

OTHER PUBLICATIONS

Chen et al., Synthesis of Heterocyclic-Fused Cyclopentadienyl Scandium Complexes and the Catalysis for Copolymerization of Ethylene and Dicyclopentadiene, Organometallics, 2015, vol. 34, pp. 455-461.

\* cited by examiner

COPOLYMER OF ETHYLENE AND A CONJUGATED DIENE, AND PROCESS FOR ITS PRODUCTION

CROSS-REFERENCE TO RELATED APPLICATION

This application is a divisional of U.S. patent application Ser. No. 15/721,902 filed on Sep. 30, 2017 entitled "Copolymer of Ethylene and a Conjugated Diene, and Process for Its Production", now issued as U.S. Pat. No. 10,280,243. The '902 application claimed priority benefits from Chinese patent application No. 201710234365.4, filed on Apr. 11, 2017. Both the '902 and '365.4 applications are hereby incorporated by reference herein in their entireties.

FIELD OF THE INVENTION

The present invention relates to the field of rubber and, in particular, to a copolymer of ethylene and a conjugated diene, a process for producing the copolymer, and a pneumatic tire comprising the copolymer.

As a readily available monomer, ethylene has widespread use in the plastics industry. Historically, the price of butadiene, which is a by-product in the production of ethylene in petroleum processing, was comparable to that of ethylene. Recently, the process of ethylene production has changed, resulting in a decrease in the output of, and a marked increase in the price of, butadiene. In contrast, the price of ethylene has decreased. Therefore, using ethylene as a raw material for rubber products, such as those used in pneumatic tires, is attractive. For example, replacing butadiene with 10 wt % of ethylene in production of polybutadiene used in tires could lead to large savings in raw material costs. However, since the polymerization of a conjugated diene (such as butadiene) and that of an α-olefin (such as ethylene) occur under different mechanisms, their copolymerization is difficult. Therefore, it is challenging to copolymerize ethylene and a conjugated diene by the same catalytic system.

SUMMARY OF THE INVENTION

A copolymer of ethylene and a conjugated diene has a content of ethylene structural unit greater than 20 mol %, preferably between 20 and 50 mol %.

In some embodiments, the copolymer has a glass transition temperature in the range of −110° C. to −90° C., preferably between −105° C. to −95° C.

In some embodiments of the copolymer, the continuous methylene sequence lengths are in a range of 12-162 methylene units, preferably in the range of 12-100 methylene units, more preferably in the range of 12-70 methylene units, and even more preferably in the range of 12-50 methylene units.

In some embodiments, the copolymer has an average molecular weight between 10,000 and 1,000,000, preferably between 100,000 and 1,000,000, and more preferably between 100,000 and 500,000.

In some embodiments, the molecular weight distribution of the copolymer is between 1 and 10, preferably between 1 and 5, and more preferably between 1 and 3.

In some embodiments, the content of the cis-1,4 structural unit in the conjugated diene structural units in the copolymer is greater than 80%, preferably greater than 90%.

In some embodiments, the content of the trans-1,4 structural unit in the conjugated diene structural units in the copolymer is less than 20%, preferably less than 10%, and more preferably less than 5%.

In some embodiments, the copolymer has a tensile strength greater than 2 MPa, preferably greater than 3 MPa, and more preferably greater than 4 MPa.

In some embodiments, the copolymer has a break elongation greater than 300%, preferably greater than 500%, and more preferably greater than 600%.

The copolymer can be used for producing a rubber composite for a pneumatic tire. The rubber composite can comprise the copolymer. In some embodiments, the rubber composite can also include other diene-based elastomers such as natural rubber, polybutadiene, and styrene butadiene rubber. The rubber composite can also contain one or more additives for producing the composite, including fillers such as silica and carbon black, curatives such as sulfur and accelerators, processing oils, fatty acids, waxes, resins, and antidegradants. The rubber composite can be used in various parts of a tire, such as the tread, the sidewall, and other parts made of rubber.

A method for producing the copolymer comprises performing a copolymerization reaction of ethylene and a conjugated diene in the presence of a catalyst system comprising a heterocyclic-fused cyclopentadienyl rare-earth metal complex represented by the following Structural Formula 1:

(1)

wherein M is selected from the group consisting of scandium (Sc), yttrium (Y), lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb) and lutetium (Lu);

$R_1$, $R_2$, $R_3$, $R_4$ and $R_5$ are the same or different from each other and each independently selected from the group consisting of a hydrogen atom, an alkyl radical having 1 to 10 carbon atoms, an alkyl radical having 1 to 10 carbon atoms containing acetal, a alkyl radical having 1 to 10 carbon atoms containing ketal, an alkyl having 1 to 20 carbon atoms containing ether, an alkenyl radical having 2 to 20 carbon atoms, an alkenyl radical having 2 to 20 carbon atoms containing acetal, a alkenyl radical having 2 to 20 carbon atoms containing ketal, an alkenyl radical having 2 to 20 carbon atoms containing ether, an arylalkyl radical having 6 to 20 carbons, an arylalkyl radical having 6 to 20 carbon atoms containing acetal, a arylalkyl radical having 6 to 20 carbon atoms containing ketal, an arylalkyl radical having 6 to 20 carbon atoms containing ether, a silyl radical having 1 to 14 carbon atoms, an silyl radical having 1 to 14 carbon atoms containing acetal, a silyl radical having 1 to 14 carbon atoms containing ketal, an silyl radical having 1 to 14 carbon atoms containing ether, or two or more groups in $R_1$-$R_5$ connected to each other to form an aliphatic or aromatic ring (for example, $R_1$ and $R_2$ are connected to each other to form a ring, or R$_2$ and R$_3$ are connected to each other to form a ring, or R$_4$ and R$_5$ are connected to each other to form a ring);

E is O, S, or N—R wherein R is methyl, phenyl or substituted phenyl;

X$_1$ and X$_2$ are single anionic ligands connected to a rare earth metal, X$_1$ and X$_2$ are be the same or different, X$_1$ and X$_2$ are each independently selected from the group consisting of a hydrogen atom, a linear or branched aliphatic radical or alicyclic radical having 1 to 20 carbon atoms, phenyl, a phenyl substituted by a linear or branched alkyl radical having 1 to 20 carbon atoms or a cyclic aliphatic radical or an aromatic radical having 6 to 20 carbon atoms, a linear or branched alkoxy radical having 1 to 20 carbon atoms, a linear or branched alkylamine radical having 1 to 20 carbon atoms, a linear or branched arylamine radical having 6 to 20 carbon atoms, a linear or branched silyl radical having 1 to 20 carbon atoms, borohydroxy radical, allyl, derivates of allyl, and halogen;

L$_w$ is a neutral Lewis base (for example one of tetrahydrofuran, ether, ethylene glycol dimethyl ether, or pyridine); and w is an integer from 0 to 3.

In some embodiments, the catalyst system comprises a heterocyclic-fused cyclopentadienyl rare-earth metal complex represented by Structural Formula 1, an organoaluminum compound, and an organoboron salt compound.

The heterocyclic-fused cyclopentadienyl rare-earth metal complex represented by Structural Formula 1 can be synthesized by the procedures disclosed in Chen et al., Organometallics 2015, 34, 455-461 or WO2015/051569, and it is preferably one of Structural Formulas 2-5 below:

(2)

(3)

(4)

(5)

In some embodiments, the organoaluminum compound contains at least one carbon-aluminum bond and is represented by Structural Formula 6 below:

(6)

wherein R$^6$ is selected from the group consisting of alkyl (including cycloalkyl), alkoxy, aryl, alkaryl, arylalkyl radicals and hydrogen: R$^7$ is selected from the group consisting of alkyl (including cycloalkyl), aryl, alkaryl, arylalkyl radicals and hydrogen and R$^8$ is selected from the group consisting of alkyl (including cycloalkyl), aryl, alkaryl and arylalkyl radicals. Representative compounds corresponding to the above-mentioned constituents are: diethylaluminum hydride, di-n-propylaluminum hydride, di-n-butylaluminum hydride, diisobutylaluminum hydride, diphenylaluminum hydride, di-p-tolylaluminum hydride, dibenzylaluminum hydride, phenylethylaluminum hydride, phenyl-n-propylaluminum hydride, p-tolylethylaluminum hydride, p-tolyl-n-propylaluminum hydride, p-tolylisopropylaluminum hydride, benzylethylaluminum hydride, benzyl-n-propylaluminum hydride, and benzylisopropylaluminum hydride and other organoaluminum hydrides. Also included are ethylaluminum dihydride, butylaluminum dihydride, isobutylaluminum dihydride, octylaluminum dihydride, amylaluminum dihydride and other organoaluminum dihydrides. Also included are diethylaluminum ethoxide and dipropylaluminum ethoxide. Also included are trimethylaluminum, triethylaluminum, tri-n-propylaluminum, triisopropylaluminum, tri-n-butylaluminum, triisobutylaluminum, triamylaluminum, trihexylaluminum, tricyclohexylaluminum, trioctylaluminum, triphenylaluminum, tri-p-tolylaluminum, tribenzylaluminum, ethyldiphenylaluminum, ethyl-di-p-tolylaluminum, ethyldibenzylaluminum, diethylphenylaluminum, diethyl-p-tolylaluminum, diethylbenzylaluminum and other triorganoaluminum compounds.

The someorganoboron salt compound can be an ionic compound consisting of an organoboron anion with a cation.

Examples of the organoboron anion include tetraphenylborate ([BPh$_4$]$^-$), tetrakis(monofluorophenyl)borate ([B(C$_6$F$_5$)$_4$]$^-$), tetrakis(difluorophenyl)borate, tetrakis(trifluorophenyl)borate, tetrakis(tetrafluorophenyl)borate, tetrakis(pentafluorophenyl)borate, tetrakis(tetrafluoromethylphenyl)borate, tetra(tolyl)borate, tetra(xylyl)borate, (tripheyl, pentafluorophenyl)borate, [tris(pentafluorophenyl), phenyl]borate, and decahydro-7,8-dicarbanium borate.

Examples of the cation include a carbonium cation, an oxonium cation, an ammonium cation, a phosphonium cation, a cycloheptatrienyl cation, and a ferrocenium cation containing a transition metal. Here, the carbonium cation includes trisubstituted carbonium cations such as a triphenylcarbonium cation ([Ph$_3$C]$^+$) and a tri(substituted phenyl)carbonium cation, and a more specific example of the tri(substituted phenyl)carbonium cation includes a tri(methylphenyl)carbonium cation. Examples of the ammonium cation include: trialkylammonium cations such as a trimethylammonium cation, a triethylammonium cation ([NEt$_3$H]$^+$), a tripropylammonium cation, and a tributylammonium cation; N,N-dialkylanilinium cations such as a N,N-dimethylanilinium cation ([PhNMe$_2$H]$^+$), a N,N-diethylanilinium cation, and a N,N-2,4,6-pentamethylanilinium cation; and dialkylammonium cations such as a diisopropylammonium cation and a dicyclohexylammonium cation. Specific examples of the phosphonium cation include triarylphosphonium cations such as a triphenylphosphonium cation, a tri(methylphenyl)phosphonium cation, and a tri(dimethylphenyl)phosphonium cation.

Examples of the organoboron salt compound include [Ph$_3$C][B(C$_6$F$_5$)$_4$], [PhNMe$_2$H][BPh$_4$], and [NEt$_3$H][BPh$_4$], [PhNMe$_2$H][B(C$_6$F$_5$)$_4$].

An organoboron compound having the same function as that of the organoboron salt compound, such as B(C$_6$F$_5$)$_3$, can also be used.

In some embodiments, the proportions of the components in the catalyst system for producing the copolymer are as follows: The molar ratio of the organoaluminum compound to rare-earth metal M is adjustable between 2:1 and 300:1, more preferably 4:1 to 200:1, most preferably between 8:1 and 100:1. The molar ratio of the organoboron salt compound to metal M is adjustable between 1:10 and 10:1, more preferably 0.5:1 and 10:1.

A wide range of catalyst amounts can be used to initiate the polymerization. Normally, a low concentration of the catalyst system is more desirable, since it can minimize, or at least reduce the production of ash. Polymerizations occurs when the catalyst amount of the rare-earth metal M varies between 0.05 and 1.0 mmol of metal per 100 g of monomer. A preferred proportion is between 0.1 and 0.3 mmol of metal per 100 g of monomer.

The concentration of the total catalyst system employed depends upon various factors, such as purity of the polymerization system, polymerization rate desired, temperature and other factors.

The polymerization reaction can be carried out in a wide range of temperatures. For example, in some embodiments the polymerization temperature is adjustable between a lower temperature, such as −60° C., and a higher temperature, such as 150° C. In some embodiments, the polymerization temperature is preferably between 10° C. and 150° C., more preferably between 25° C. and 150° C., and most preferably between 25° C. and 90° C.

In some embodiments, the reaction pressure is not specifically limited. For example, in some embodiments, the polymerization reaction can be conducted at one atmospheric pressure or it can also be carried out at less than 1 atm or greater than 1 atm. The pressure of ethylene is preferably 1 to 10 atm.

In some embodiments, the polymerization is carried out in a hydrocarbon solvent. Suitable solvents include aliphatic saturated hydrocarbons, aromatic hydrocarbons, aryl halides or cycloalkanes, preferably one of hexane, cyclohexane, benzene, toluene, xylene, chlorobenzene, dichlorobenzene, or bromobenzene, or mixtures thereof.

In some embodiments, the monomers used are ethylene and a conjugated diene monomer. In some embodiments, the conjugated diene is selected from conjugated dienes containing 4-20 carbon atoms, preferably is 1,3-butadiene, isoprene, 2,3-dimethyl-1,3-butadiene, 2-ethyl-1,3-butadiene, 2-phenyl-1,3-butadiene, 1,3-hexadiene, 4-methyl-1,3-pentadiene, 1,3-pentadiene, 3-methyl-1,3-pentadiene, 2,4-dimethyl-1,3-pentadiene, and 3-ethyl-1,3-pentadiene.

During the polymerization reaction, a solution of the conjugated diene monomer can be added to the polymerization reaction system of an ethylene-saturated solvent solution comprising the rare earth catalyst, an organoaluminum compound, and an organoboron salt compound. Preferably, the solution of the conjugated diene is gradually added to the solution containing the ethylene, rare earth catalyst, organoaluminum compound, and organoboron salt compound. More preferably, the conjugated diene solution is added at a constant speed during the whole polymerization reaction.

DETAILED DESCRIPTION OF ILLUSTRATIVE EMBODIMENTS

Examples 1-3

The heterocyclic-fused rare-earth metal complex of Structural Formula 5 can be used as a catalyst precursor for catalyzing the copolymerization of ethylene and butadiene by the following procedure, to produce a copolymer of ethylene and butadiene.

First, 250 mL toluene was added to a 2 L nitrogen-purged stainless reactor vessel, and 1.0 atm ethylene was charged thereinto under vigorous stirring, so that a saturated state thereof in the toluene solution was achieved. The complex of Structural Formula 5 (86 mg, 146 μmol), Al$^i$Bu$_3$ (1.5 mL, 1.46 mmol, 1.0 M toluene solution) and triphenylcarbonium tetrakis(pentafluorophenyl)borate, [Ph$_3$C][B(C$_6$F$_5$)$_4$] (144 mg, 146 μmol) were dissolved into 20 mL of toluene, to produce a catalyst solution. The catalyst solution was then taken out from glove box and quickly added to the polymerization reaction system at 40° C., to initiate polymerization. Meanwhile, a toluene solution of butadiene (130 g solution, 26.7 wt % butadiene) was added into the polymerization system at a constant speed. The speed of introduction of the butadiene solution was controlled by a flowmeter. Ethylene was continuously introduced during the polymerization process. After the addition of the butadiene solution, 20 mL methanol hydrochloride solution was added immediately to end the reaction. Then a large amount of ethanol was added to isolate the copolymer, which was dried under vacuum at 40° C., until the weight of the polymer did not change.

Copolymer from Example 1 was obtained using the above method and was characterized. The results are shown below in Table 1.

Measurement of Content of Ethylene

Figure 1:
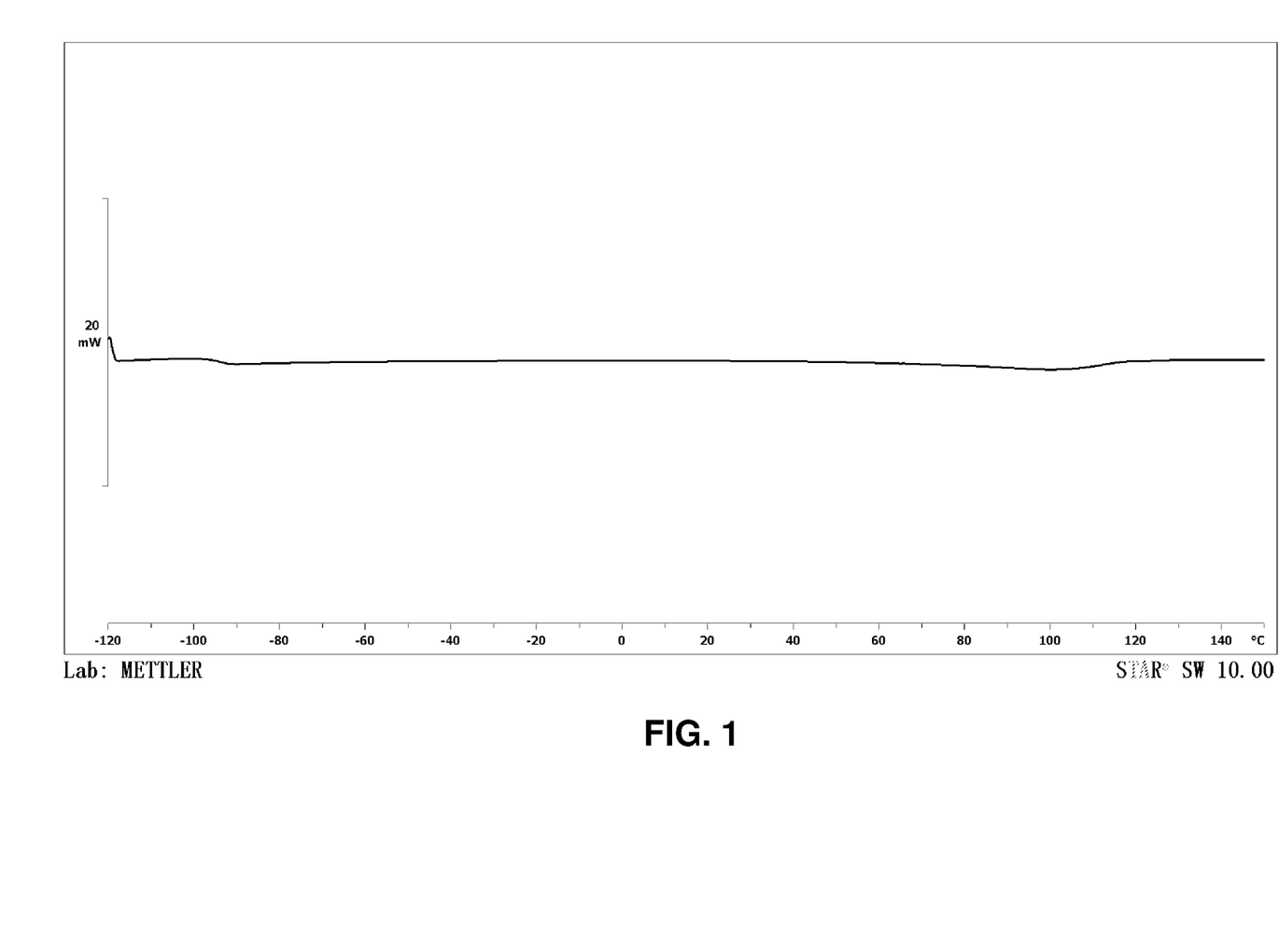
FIG. 1 shows a Differential Scanning calorimetry (DSC) analysis of the copolymer produced in Example 1, according to an embodiment of the present copolymer and the process for its production.
Figure 2:
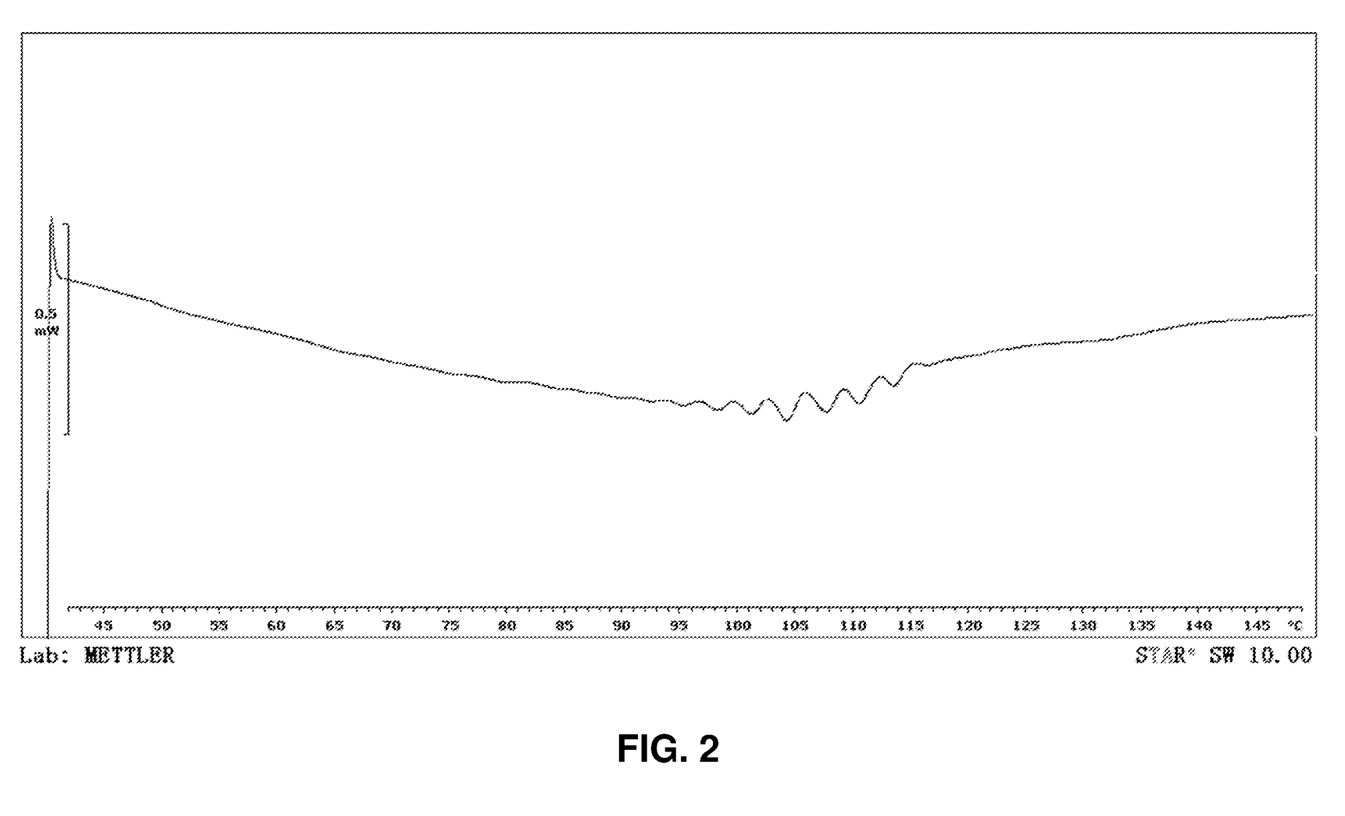
FIG. 2 shows a DSC analysis of the copolymer produced in Example 1 after a successive nucleation/annealing treatment.
Figure 3:
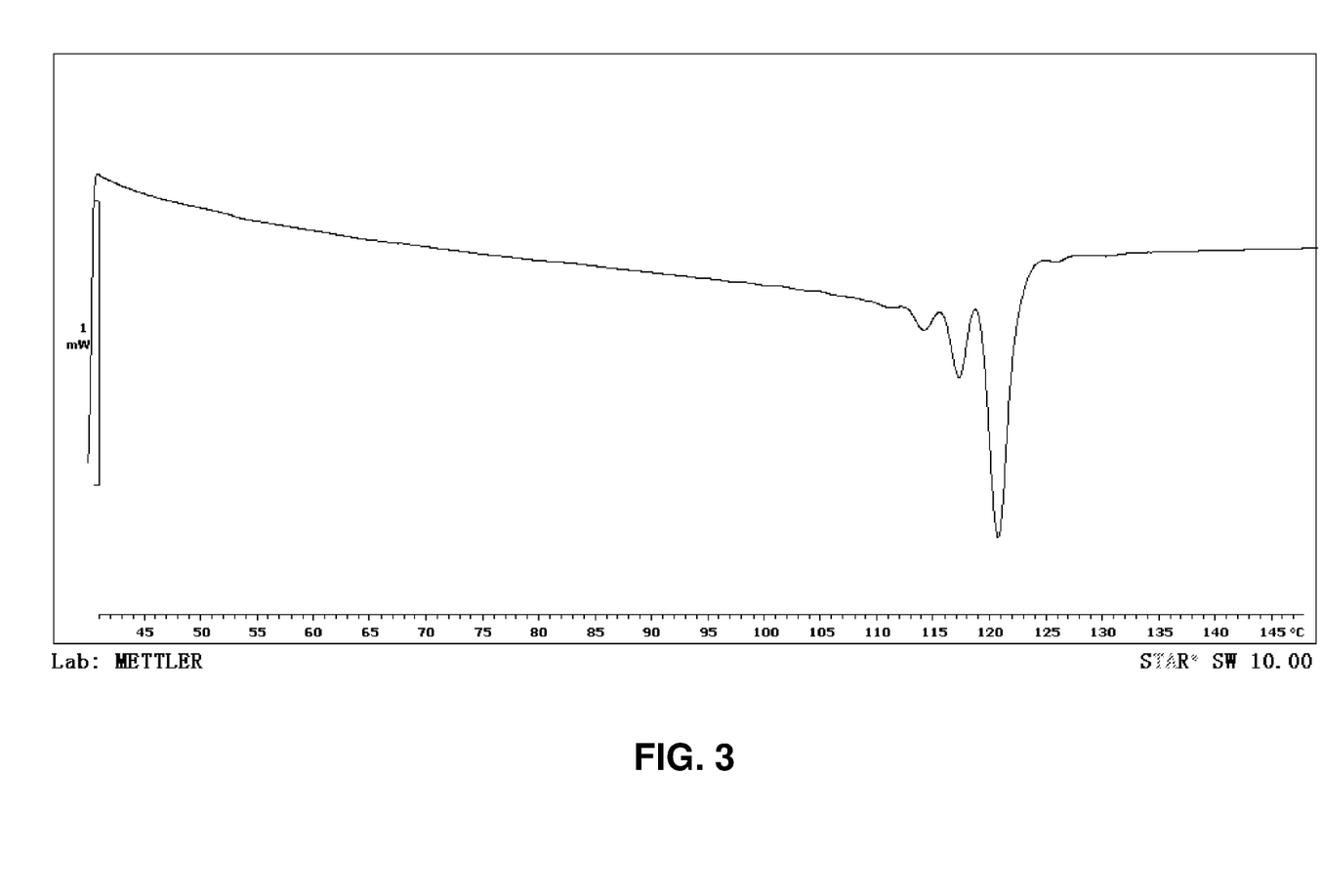
FIG. 3 shows a DSC analysis of copolymer produced in Example 4 after a successive nucleation/annealing treatment.
Figure 4:
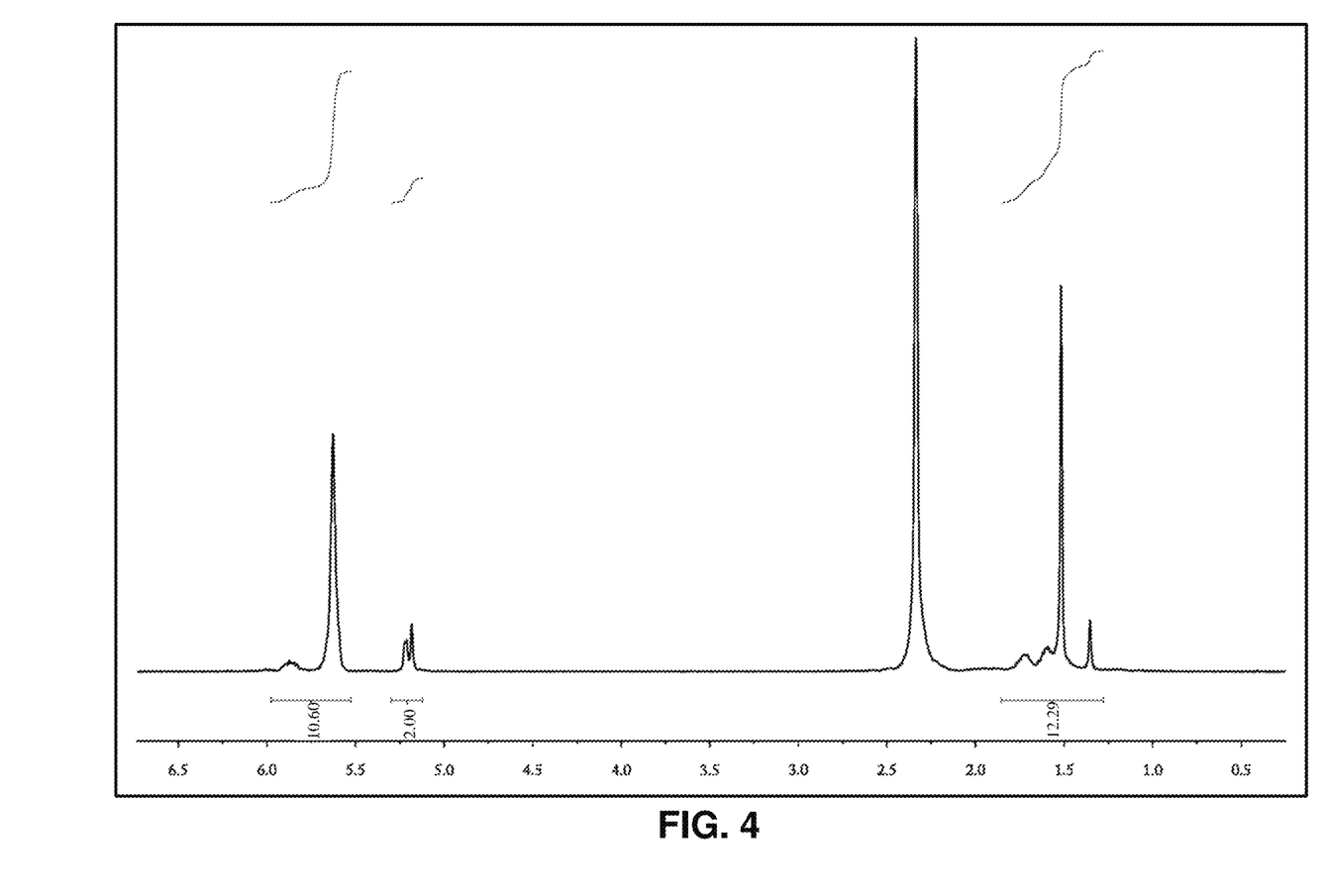
FIG. 4 shows a $^1$H Nuclear Magnetic Resonance (NMR) diagram of copolymer of Example 2.

The content of the ethylene structural unit in the copolymer was calculated according to the $^1$H NMR diagram of the copolymer measured in $C_6D_4Cl_2$ at 120° C. as follows:
$f_E = (I_{(1.21-1.79)} - 1.5*I_{5.20})/(I_{(1.21-1.79)} + 2*I_{(5.50-6.00)} - 0.5*I_{5.20})*100\%$.

Measurement of the Glass Temperature ($T_g$) of the Copolymer

The glass temperature of the copolymer was measured by differential scanning calorimetry (DSC) in accordance with GB/T 29611-2013.

Measurement of Continuous Methylene Sequence Length (MSL) in the Copolymer

Following the procedures of M. Zhang, S. E. Wanke, "Quantitative determination of short-chain branching content and distribution in commercial polyethylene by thermally fractionated differential scanning calorimetry", Polymer Engineering & Science, 2003, 43, 1878-1888, the copolymer sample was subjected to a successive self-nucleation and annealing thermal analysis (SNA), so that continuous methylene sequences with different lengths (MSL) were classified. A set of segments having similar continuous methylene sequence lengths resulted in crystals having similar sizes, and would melt at similar temperatures (F. M. Mirabella, J. Polym Sci: Part B: Polym Phys., 2001, 39, 2800). Next, melting endothermic peaks of the copolymer were measured by differential scanning calorimetry (DSC) in accordance with GB/T 29611-2013. Each endothermic peak corresponded to a continuous methylene sequence having the corresponding length. According to Equation I below, the lengths of continuous methylene sequences in the copolymer were calculated.

$$MSL = \frac{2}{e^{(\frac{142.2}{T} - 0.3451)} - 1} \quad (I)$$

In Equation I, MSL represents the length of continuous methylene sequence, and T is the peak value of the melting endothermic peak in the DSC curve.

Measurement of the Weight Average Molecular Weight ($M_n$) and the Molecular Weight Distribution ($M_w/M_n$)

The weight average molecular weight ($M_n$) and the molecular weight distribution ($M_w/M_n$) were measured by gel permeation chromatography (GPC) at 150° C., in which polystyrene was used as the standard and 1,2,4-$C_6Cl_3H_3$ was used as the mobile phase.

Measurement of the Cis-1,4 Structural Unit and the Trans-1,4 Structural Unit in Conjugated Diene Structural Units in the Copolymer The cis-1,4 structural unit and the trans-1,4 structural unit in conjugated diene structural units in the copolymer were measured according to the $^{13}$C NMR diagram of the polymer.

Measurement of the Tensile Strength and the Break Elongation of the Copolymer The tensile strength and the break elongation of the copolymer were measured by a multifunctional mechanical tester in accordance with GB/T528-1998.

Copolymers in Example 2 (25° C.) and Example 3 (30° C.) were obtained by keeping the other polymerization conditions constant, and varying the polymerization temperature. The results are shown in Table 1.

TABLE 1

| Example No. | 1 | 2 | 3 |
| --- | --- | --- | --- |
| Temperature, ° C. | 40 | 25 | 30 |
| Ethylene[a], mol % | 45 | 29 | 36 |
| trans-1,4 bond content | 17 | 12 | 15 |
| $Mn(10^4)$[b] | 12.8 | 32.2 | 21.5 |
| Mw/Mn | 1.68 | 1.72 | 1.71 |
| $T_g$[c], ° C. | −94.1 | −95.7 | −94.3 |
| MSL[d] | 44-88 | 12-50 | 30-70 |

[a]calculated by $^1$H NMR diagram of the polymer;
[b]measured by GPC in 1,2,4-$C_6Cl_3H_3$ at 150° C. using polystyrene standard;
[c]$T_g$ was measured by DSC according to GB/T 29611-2013;
[d]SNA was done over a temperature range of 62 to 132° C. using a heating rate of 10° C./min, annealing time of 15 min and cooling rate of 10° C./min with a 5° C. increment between successive heating operations. DSCs of SNA treated samples were done according to GB/T 29611-201. MSLs were calculated by equation (I).

As shown in Table 1, increasing the polymerization temperature increased the ethylene content and the trans-1,4 structural unit content in conjugated diene structural units in the obtained copolymer. This resulted in that lengths of the continuous methylene sequences in the copolymer becoming longer. The glass transition temperature of the copolymer also increased slightly.

Examples 4-8

The copolymers of Examples 4-8 were produced using a catalyst represented by Structural Formula 3, following the general procedure of Example 1, by changing the addition speed of the butadiene solution. The results are shown in Table 3. Compared to the copolymer afforded by using the catalyst represented by Structural Formula 5, the copolymers produced by using the Structural Formula 3 catalyst have a lower $T_g$ between −101° C. and −103° C.; the contents of trans-1,4 structural unit in conjugated diene structural units decreased to between 7 and 9 mol %; and the range of the continuous methylene sequence lengths in the copolymer widened to between 44 and 160 methylene groups. Increasing the speed of the addition of butadiene solution decreased the content of ethylene structural unit in the resultant copolymer from 41.7 mol % to 17 mol %. This is shown in Table 2 below.

TABLE 2 [a]

| Example No. | 4 | 5 | 6 | 7 | 8 |
| --- | --- | --- | --- | --- | --- |
| $V_{BD}$[b], mL · min$^{-1}$ | 3 | 5 | 7 | 9 | 12 |
| Ethylene[c], mol % | 41.7 | 35.6 | 28.8 | 24.6 | 17 |
| trans-1,4 bond content[d] | 8 | 9 | 8 | 7 | 8 |
| $Mn(10^4)$[e] | 8.2 | 13.3 | 12.2 | 13.1 | 14.9 |
| Mw/Mn | 1.82 | 1.67 | 1.80 | 1.60 | 1.85 |
| $T_g$[f], ° C. | −102 | −101 | −102 | −103 | −102 |
| MSL[g] | 74-160 | 60-154 | 56-150 | 50-142 | 44-138 |

[a] Polymerization conditions: toluene, 80 μmol of Sc, 80 μmol of [Ph$_3$C][B(C$_6$F$_5$)], 800 μmol of Al$^i$Bu$_3$, ethylene 1 atm, T = 40° C.
[b]The addition speed of butadiene solution.
[c]Determined by $^1$H NMR spectroscopy in $C_6D_4Cl_2$ at 125° C.
[d]Determined by $^{13}$C NMR spectroscopy in $C_6D_4Cl_2$ at 125° C.
[e]Measured by GPC in 1,2,4-$C_6Cl_3H_3$ at 150° C. using polystyrene standard.
[f]$T_g$ was measured by DSC.
[g]MSL represents the length of methylene sequences calculated by equation (I).

The tensile strength and the break elongation of the copolymers were measured by a multifunctional mechanical tester in accordance with GB/T528-1998. The results are shown in Table 3 below.

TABLE 3

| Example No. | 3 | 5 | 7 |
|---|---|---|---|
| Ethylene, mol % | 36 | 35.6 | 24.6 |
| MSL | 30-70 | 60-154 | 56-150 |
| Tensile Strength, MPa | 3.28 | 4.0 | 3.15 |
| Elongation at Break, % | 650 | 360 | 630 |

As seen in Table 3, when the ethylene structural unit contents in the copolymers are similar, the copolymer of Example 3 with shorter ethylene sequence lengths shows a significantly higher break elongation than the copolymer of Example 5, which has longer ethylene sequence lengths. The copolymer of Example 7, which has a smaller ethylene structural unit content, has a break elongation similar to the copolymer of Example 3, even though it has longer ethylene sequences.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A copolymer of ethylene and a conjugated diene, wherein the ethylene content in said copolymer is larger than 20 mol %, said copolymer has a glass transition temperature between −110° C. and −90° C., and continuous methylene sequence lengths (MSL) said the copolymer are in a range of 12-162 methylene units.

2. The copolymer of claim 1, wherein said conjugated diene is selected from butadiene, isoprene, 2,3-dimethyl-1,3-butadiene, 2-ethyl-1,3-butadiene, 1,3-hexadiene, 2-phenyl-1,3-butadiene, 4-methyl-1,3-pentadiene, 1,3-pentadiene, 3-methyl-1,3-pentadiene, 2,4-dimethyl-1,3-pentadiene, and 3-ethyl-1,3-pentadiene.

3. The copolymer of claim 1, wherein ethylene content in said copolymer is between 20 mol % and 50 mol %.

4. The copolymer of claim 1, wherein said copolymer has a number average molecular weight ranging from 100,000 to 500,000.

5. The copolymer of claim 1, wherein said copolymer has a molecular weight distribution less than 5.

6. The copolymer of claim 1, wherein trans-1,4 structure content in conjugated diene units is less than 20 mol %.

7. The copolymer of claim 1, wherein the MSL ranges from 12 to 100.

8. The copolymer of claim 1, wherein the MSL ranges from 12 to 70.

9. The copolymer of claim 1, wherein, the MSL ranges from 12 to 50.

10. A pneumatic tire comprising the copolymer of claim 1.

* * * * *